United States Patent
Bradley et al.

(10) Patent No.: US 7,092,975 B2
(45) Date of Patent: Aug. 15, 2006

(54) METHODS AND APPARATUS FOR MANAGEMENT OF DATA STORAGE RESOURCES

(75) Inventors: Donald A. Bradley, Raleigh, NC (US); Robert Peter Noble, Wake Forest, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 262 days.

(21) Appl. No.: 10/248,717

(22) Filed: Feb. 12, 2003

(65) Prior Publication Data

US 2004/0158573 A1    Aug. 12, 2004

(51) Int. Cl.
*G06F 17/30* (2006.01)
*G06Q 99/00* (2006.01)

(52) U.S. Cl. .......................... 707/204; 705/51

(58) Field of Classification Search ............... 707/1–3, 707/100–102, 104.1; 705/51–52, 27–28

See application file for complete search history.

(56) References Cited

U.S. PATENT DOCUMENTS

| | | | |
|---|---|---|---|
| 2001/0052108 A1* | 12/2001 | Bowman-Amuah | 717/1 |
| 2003/0120600 A1* | 6/2003 | Gurevich | 705/50 |
| 2003/0229900 A1* | 12/2003 | Reisman | 725/87 |
| 2004/0107125 A1* | 6/2004 | Guheen et al. | 705/7 |
| 2004/0139049 A1* | 7/2004 | Hancock et al. | 707/1 |

* cited by examiner

*Primary Examiner*—Alford W. Kindred
(74) *Attorney, Agent, or Firm*—Priest & Goldstein, PLLC (57) ABSTRACT

Techniques for monitoring of storage usage and trends in a document image processing and storage system are described. A storage and retrieval monitor resides on a storage server and monitors the status of volumes and units on which data is stored, completed storage requests and pending storage and retrieval requests. The storage and retrieval monitor analyzes completed and pending storage requests in order to project usage trends over time, and also analyzes the storage status in order to determine the used and available space and the space dedicated to various units and classes of data such as documents and families of documents. The storage and retrieval monitor generates alerts when the available storage space falls below a predetermined limit. The alerts and the usage and status information are presented to a user through a user interface allowing easy access to the storage and usage information and the ability to select desired information for display.

12 Claims, 6 Drawing Sheets

METHODS AND APPARATUS FOR MANAGEMENT OF DATA STORAGE RESOURCES

BACKGROUND OF INVENTION

The present invention relates generally to management of data storage resources. More particularly, the invention relates to techniques for monitoring data storage resources in order to allow a user or operator to determine when additional resources are likely to be needed.

Many business transactions and other transactions having legal effect, such as those related to mortgages and mortgage insurance, involve the creation and management of documents. The usefulness of many such documents, such as promissory notes, sales contracts, loan applications and title encumbrances such as mortgages and deeds of trust, does not depend solely on the information contained therein, but on the function of the documents as memorials of legal transactions. Because they include such indicia of execution as signatures and notarizations of signatures, many documents must be stored in the form of paper records or images of paper records.

For example, a mortgage insurance application or policy may include text information that can be stored in files of relatively small size. Associated with this text information, however, will be supporting documents, such as signed applications and contracts, title deeds, deeds of trust and title records including records of various transactions affecting the title of a subject property. Such supporting documents may be stored most conveniently as captured images or as paper documents. Captured images are typically stored as graphic files and are relatively large. Even in cases where actual paper documents are stored, captured images of the documents will suitably be stored as captured images associated with text files in order to provide easy access to such documents for review. Text files containing transaction information, along with graphic files containing images of supporting documents, are preferably stored on a storage medium such as an optical storage medium providing a high capacity archival storage capability.

A large mortgage insurance processing center may manage many hundreds or thousands of application and policy documents, so that volumes of storage media may need to be removed and replaced with blank volumes at frequent intervals. The length of the intervals between replacement of media volumes will typically depend on how rapidly each volume is filled.

Alerting a user or operator only when a volume has been filled and must be replaced is inconvenient and reduces operating efficiency, because by that time the volume is unavailable for writing of new information. Writing of new information must be delayed until the filled volume has been replaced and a new volume is available for writing. Replacing volumes at fixed intervals may waste operator time or available media space if volumes are replaced while they still have significant space available. Greater efficiency in use of time and resources, and in availability of volumes for writing, would be achieved if the information about the usage of storage media and the remaining capacity available on the storage media could be provided to the user and the operator on an ongoing basis.

There exists, therefore, a need for a monitoring system for providing a user and an operator with information relating to the ongoing use, and trends in use, of media in a data storage and retrieval system.

SUMMARY OF INVENTION

A data processing system according to an aspect of the present invention employs a storage station suitably comprising a plurality of storage units hosting removable optical storage volumes. The data processing system may suitably be adapted for the processing, creation and storage of documents including captured images of paper documents and creation and storage of electronically generated images similar to captured images of paper documents. The documents may be related to business transactions and may be classified into categories according to the particular transaction or type of transaction to which they relate.

A storage station is accessible through a plurality of user workstations. The storage station preferably hosts a storage server controlling the functions of the storage server and monitoring the status, usage and available capacity of the storage units and the volumes hosted on the storage units. The storage server maintains databases containing information about the status of the storage units and volumes hosted on the storage unit. The information suitably includes identification of each document and document family stored on each storage unit and volume and information describing the used and available capacity of each storage unit and volume. The storage server further maintains a database relating to completed read or write operations for each storage unit and pending read and write requests for each storage unit. The storage server implements a storage and retrieval monitor that monitors the status information and the completed operation and pending request information and analyzes the information to determine usage trends to indicate to a user when a unit or volume is likely to be filled, requiring replacement of a volume, and which unit or volume is likely to be filled. The storage and retrieval monitor further examines the status information, the completed operation information and the pending request information in order to generate alerts indicating when the available capacity of a unit or volume is critically low. The storage and retrieval monitor formats the status information, the completed operation and pending request information, the usage trend information and the alerts and provides the information to a user in a readily accessible format using an interface adapted to display the information in a conveniently accessible format and to allow the user to make selections about what information to display.

A more complete understanding of the invention, as well as further features and advantages of the invention, will be apparent from the following Detailed Description and from the claims which follow below.

DETAILED DESCRIPTION

Figure 1:
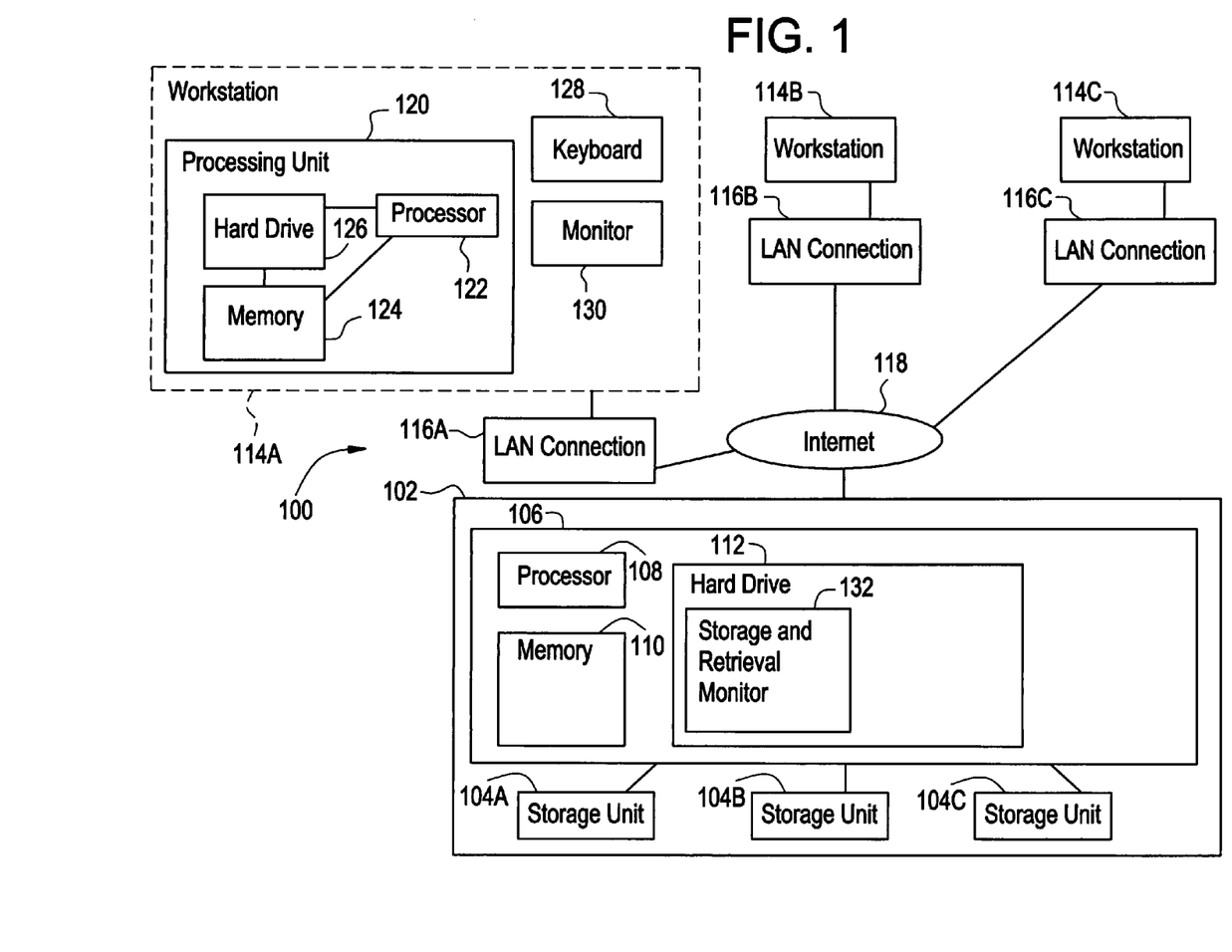
FIG. 1 illustrates a data processing system according to an aspect of the present invention.

FIG. 1 illustrates a data processing system 100 employing techniques of data storage monitoring according to the present invention. The system 100 includes a storage station 102 comprising a plurality of data storage units 104A–104C. The data storage units 104A–104C may suitably be optical disk drives using removable optical media. The media suitably comprise towers of disk platters. A tower of disk platters is a grouping of individual disk platters arranged in a sp aced vertical stack, with a spindle securing the platters and providing spacing between the platters and an axis of rotation for the platters. Blank space on a platter can be written to once and only once, so that when a platter is full it can no longer be written to. However, a platter can be read an indefinite number of times. When all platters comprising a tower are full, or when the available space on the tower or on a platter of interest falls below a desired amount, the tower may be removed and replaced with a tower having blank space available, such as a tower having all platters blank. Each platter and each tower suitably includes identification information so that a desired platter and tower can easily be retrieved and identified.

The storage station 102 is preferably controlled by a storage server 106. The storage server 106 includes a processor 108, memory 110 and a hard drive 112. The hard drive 112 suitably provides caching for data stored on the data storage units 104A–104C, provides space for building and storage of an index of data on the units 104A–104C and hosts data and programming needed in the operation of the storage station 102. Once an index has been built on the hard drive 112, it may suitably be copied to a media volume on one of the data storage units 104A–104C.

The storage station 102 is accessible by a plurality of user workstations 114A–114C, suitably through one or more local area network connections 116A–116C which are in turn connected to a distributed network such as the Internet 118. The workstations 114A–114C may suitably be used to view and make entries into user interfaces in order to direct storage and retrieval of data using the storage station 102. The workstation 114A is illustrated in detail, and can be seen to include a processing unit 120. The processing unit 120 may suitably include a processor 122, memory 124 and hard drive 126. The workstation 114A also includes a keyboard 128 and a monitor 130, in order to allow operation of the workstation 114A by a user. In order to avoid redundancy, the workstations 114B and 114C are not shown in detail, but they may include components similar to those of the workstation 114A.

The storage server 106 hosts a storage and retrieval monitor 132, preferably implemented as software residing on the hard drive 112 and loaded into the memory 110 for execution by the processor 108. The storage and retrieval monitor 132 is accessible to the workstations 114A–114C and can provide information and accept commands through interfaces presented on the workstations 114A–114C.

Figure 2:
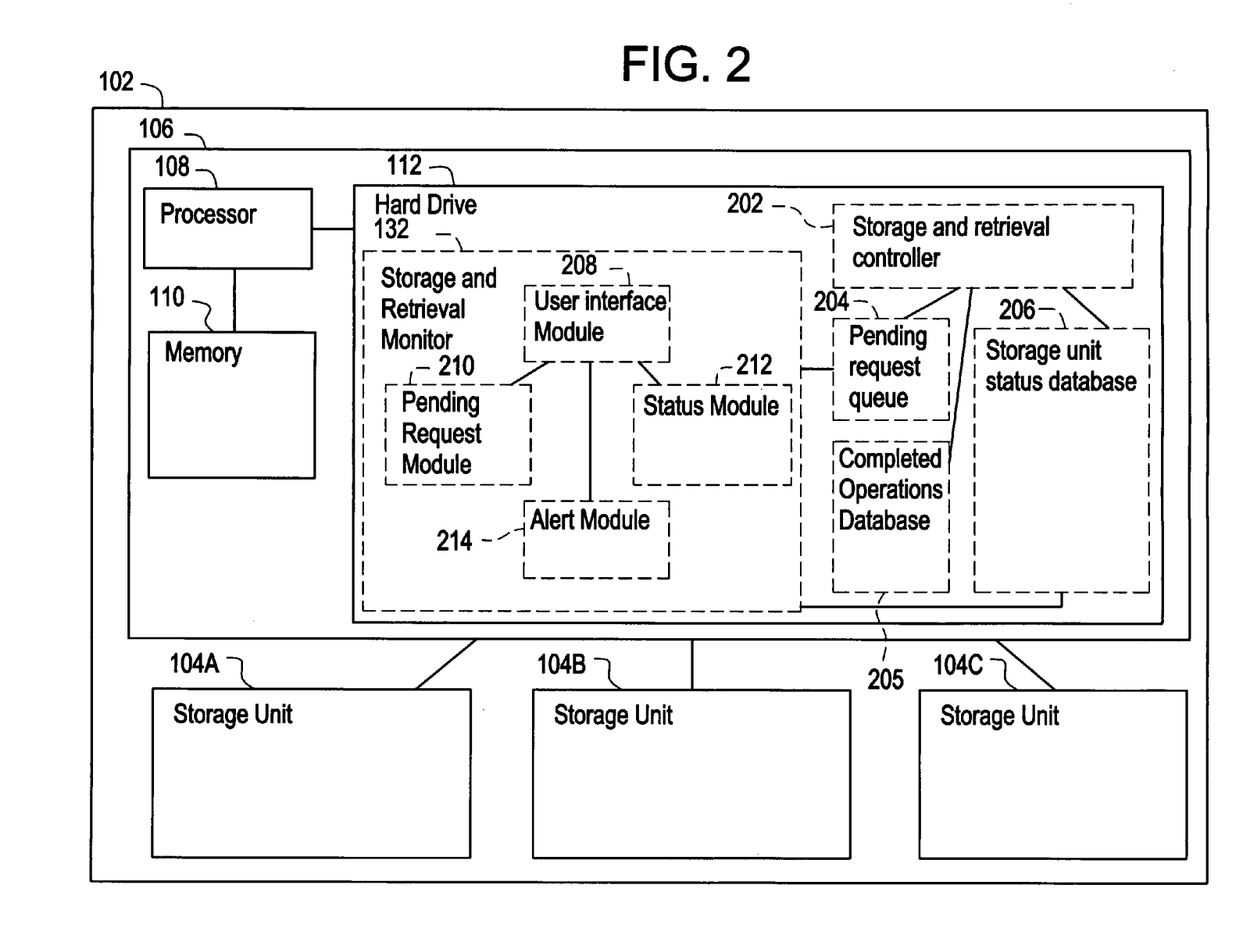
FIG. 2 illustrates a storage station according to an aspect of the present invention.

FIG. 2 illustrates the storage station 102 in greater detail, showing additional details of the storage units 104A–104C and the media and documents stored thereon, the storage server 106 and additional details of the storage and retrieval monitor 132, as well as other components used in storage and retrieval of data.

In the exemplary embodiment described here, the storage units 104A–104C are used to store data used for mortgage insurance transactions. The stored data is organized in the form of documents, with the documents being grouped into one of three document families. The document families are Production (PROD), Completed Branch Application (CBA) and Conversion (CONV).

The hard drive 112 hosts a storage and retrieval controller 202, which controls the reading and writing operations of the storage station 102, receiving commands from the workstations 114A–114C and managing the execution of the commands. The storage and retrieval controller 202 employs a pending request queue 204, which is maintained on the hard drive 112. When the storage and retrieval controller 202 receives a user command, it prepares an operation request based on the user commands and passes the operation request to the pending request queue 204. Each operation request includes information identifying the document. Such information suitably includes document identity, document family and the nature of the operation, including whether the operation is a read or write operation and, if the operation is a write operation, the size of the document to be written. Once a queued operation request has been performed, the request is removed from the queue 204 and an entry describing the operation is prepared and placed in a completed operations database 205. If the operation was a write operation, a storage unit status database 206 is updated with the results of the executed operation. Updating insures that the information describing the filled and available capacity of the platter, tower and storage unit to which data was written in accordance with the write operation are current, and insures that the indexing information for retrieving the document is properly stored.

The storage and retrieval monitor 132 examines the storage station 102 at frequent intervals in order to determine the capacity and usage of the storage station 102. The storage and retrieval monitor provides a user interface, accessible by the workstations 114A–114C, allowing the user to review capacity and usage information.

The storage and retrieval monitor 132 includes a user interface module 208, a pending request module 210, a status module 212 and alert module 214. The pending request module 210 monitors the pending request queue 204 for pending read and write requests and collects information relating to the pending request. The information includes the number of pending requests, the platter and tower to which each request is directed, the document and document family identification for the document to be read or written in response to each request and other relevant information. The pending request module 210 also computes statistical information for the status of the queue over time, in order to determine usage trends and to allow the user to make projections as to when a platter or tower can be expected to fill.

The pending request module 210 supplies the pending request information to the user interface module 208. The user interface module 208 provides a graph showing write requests over time, and also displays numerical values showing the total number of write requests and the number of write requests for each document family. The user interface module 208 also displays the number of outstanding read requests and outstanding write requests for each platter, identifying each platter by platter and tower identification.

The status module 212 monitors the storage units 104A–104C in order to determine their total capacity and used and unused capacity at a particular time, and provides status information for each of the storage units to the user interface module 208. The user interface module 208 displays for each platter the platter identification, document and document family identification, the remaining available space on the platter, expressed as a percentage, the bytes available, bytes used, the number of write requests, the number of reads and extended reads, the identification of the tower hosting the platter, document count, and page count. If a platter is full, the date that the platter was filled is displayed. The user interface module 208 also displays a time stamp showing the time the status information was collected.

The alert module 214 receives status information from the status module 212 and examines the status information to determine whether or not the remaining unused capacity for a platter or tower has fallen below a predetermined level. In addition, the alert module 214 can receive usage trend information from the pending request module 208 and status information from the status module 210 and make estimates as to when the unused capacity of a platter or tower will fall below a predetermined level in light of prevailing usage trends. The alert module 214 provides this information to the user interface module 208, which displays a color coded alert showing the information.

Figure 3:
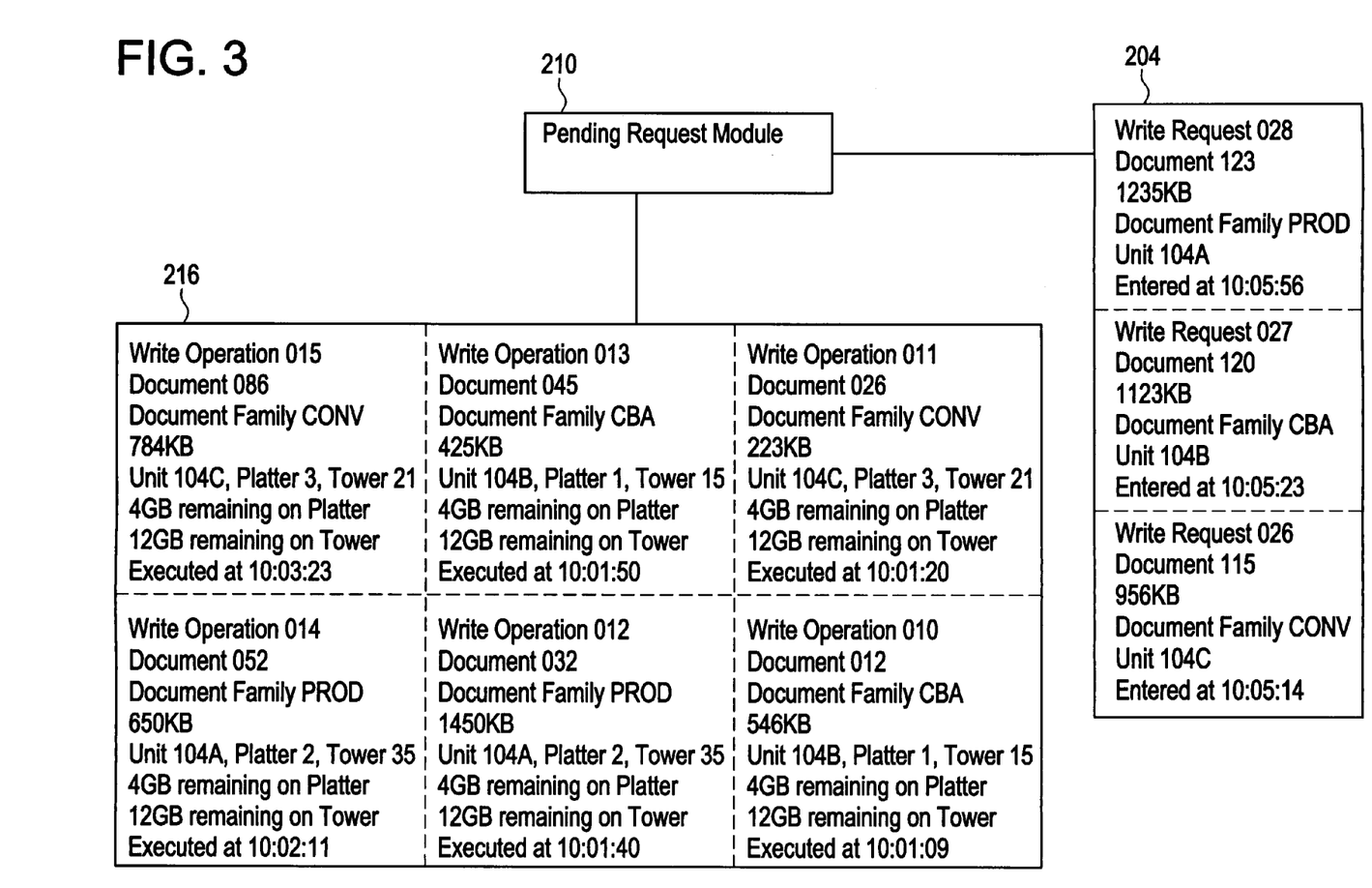
FIG. 3 illustrates a pending request module according to an aspect of the present invention.

FIG. 3 illustrates the pending request module 210, along with the pending request queue 204 and the completed operations database 216. Various representative entries in the pending request queue 204 can be seen. The completed operations database 216 includes various representative pending and processed entries. The pending request module 210 can analyze the completed operations database 216 and the pending request queue 204 to determine trends in usage of storage capacity, in order to provide a user with information describing these trends. The pending request module 210 can examine the completed operations database 216 in order to compute the rate at which the capacity of each platter and tower has been used, and can examine the pending request queue 204 to determine the expected rate at which capacity will be used. The pending request module 210 can make computations indicating when various platters or towers will become filled and will need to be replaced, and can format this information as required by the interface module 208 and store it for retrieval by the interface module 208. Alternatively, the pending request module can make required computations on demand when invoked by the interface module 208.

Figure 4:
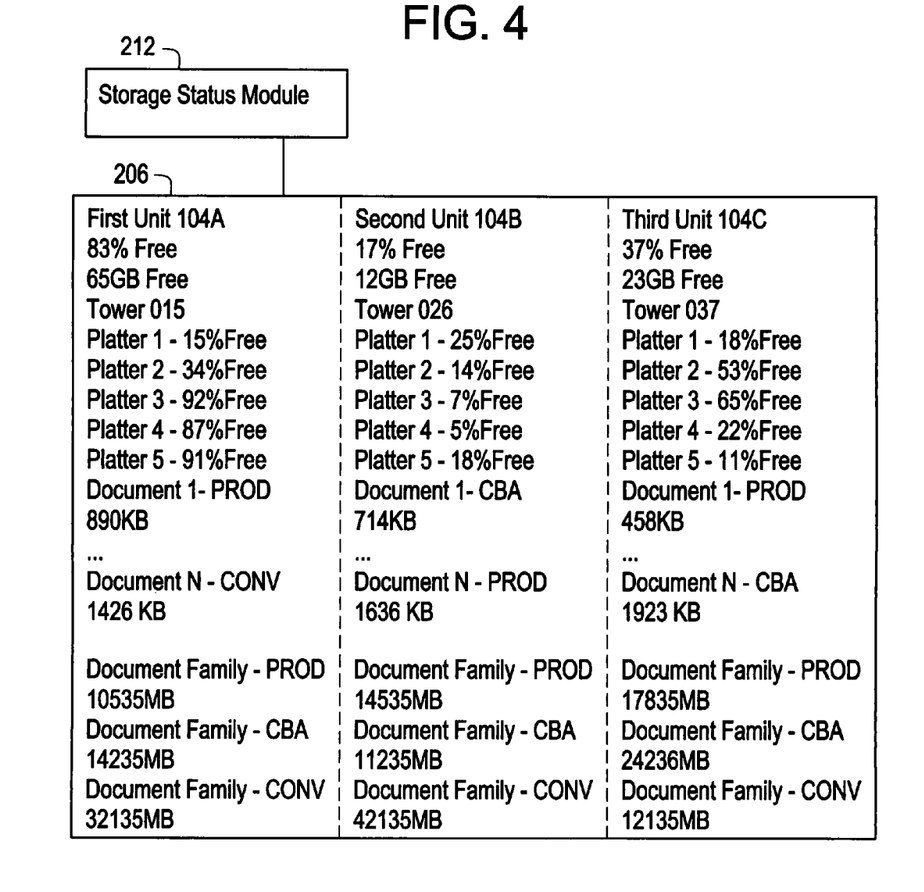
FIG. 4 illustrates a storage status module according to an aspect of the present invention.

FIG. 4 illustrates additional details of the status module 212 and the storage status database 206. Details of the information stored in the storage status database 206 are shown. At predetermined, preferably frequent intervals, or when requested by the user interface module 208, the status module 212 examines the storage status database 206 and provides storage status information to the user interface module 208. The storage status information may include information identifying the amount of used and available capacity, in percentage terms and in bytes, of each platter, tower and storage unit, the amount of capacity occupied by each document and family of documents, and other information. The user interface module 208 assembles and displays this and other information as described further below.

Figure 5:
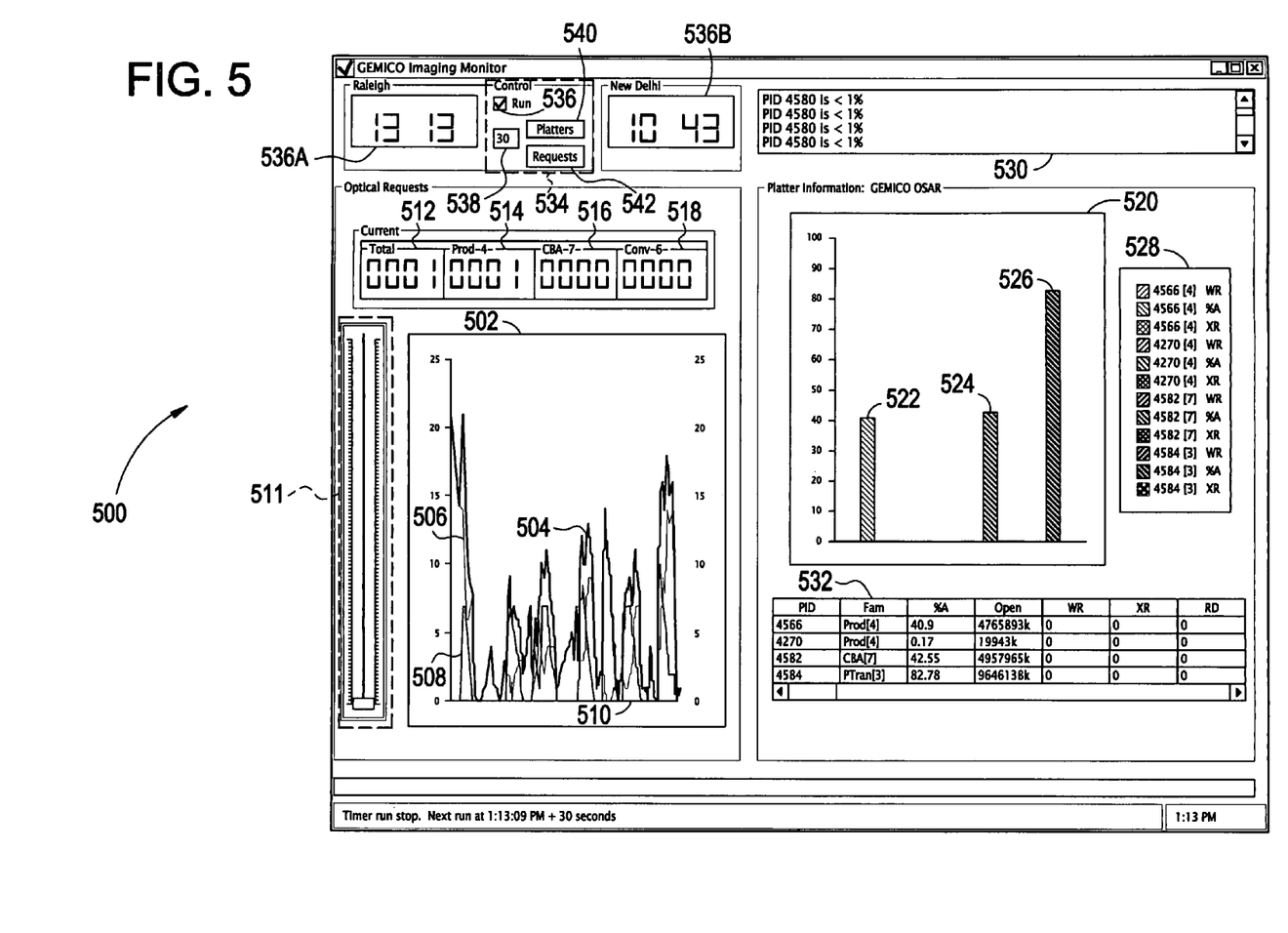
FIG. 5 illustrates a user interface according to an aspect of the present invention.

FIG. 5 illustrates a user display 500 generated by the user interface module 208. The user interface module 208 suitably controls communication with a workstation such as the workstation 114A of FIG. 1, in order to present user displays such as the display 500 using a monitor such as the monitor 130 of FIG. 1. The user interface module 208 employs the user display 500 to provide information for the user and to receive user commands. The display 500 includes various fields and windows that provide a user with information relating to the status and usage of the storage station 102 and the media being used in the storage station 102.

The user display 500 includes a graph 502, including color coded curves 504, 506, 508 and 510. The curves 504, 506, 508 and 510, respectively, are plots of write requests versus time for each family of documents. The curve 504 plots the total number of write requests over time, the curve 506 plots the number of write requests of production documents over time, the curve 508 plots the number of write requests of CBA documents over time and the curve 510 plots the number of write requests of CONV documents over time. A slider 511 may be used to adjust the scale of the graph 502, in order to scale the graph 502 to one of the curves 504, 506, 508 and 510 that a user desires to view. It is possible, for example, for the curve 504 to represent 200 write requests at a particular time while the curve 510 represents 2 write requests at the same time. Adjusting the scale of the graph 502 allows the user to readily see the information provided by both curves.

The display 500 includes a set of display windows 512, 514, 516 and 518, representing the current number of write requests for all documents, production documents, CBA documents and CONV documents, respectively. The display windows 512, 514, 516 and 518 correspond to the curves 504, 506, 508 and 510, respectively. If a user clicks on one of the display windows 512, 514, 516 and 518, the corresponding one of the curves 504, 506, 508 and 510 is highlighted, allowing easy viewing by the user of information relating to the desired family of documents.

The display 500 further includes a graphical platter status window 520, providing graphical information showing the usage of currently used platters, expressed as a percentage of total capacity used. The platter status window 520 can be seen to display histogram bars 522, 524 and 526, showing the filled capacity of the platters indicated by the bars 522, 524 and 526. This information is extracted from the storage status database 206 by the status module 212, and provided to the user interface module 202 for display. The display 500 also includes a legend 528, correlating the color and pattern used to draw the histogram bars with the platters indicated by the bars.

The display 500 further includes a textual platter information window 530, showing information of interest for the installed platters. The information includes the platter identification, the document family to which the platter is dedicated, percentage of capacity remaining available, remaining bytes available, pending write requests, pending extended reads, pending reads, storage tower, or library, hosting the platter, storage unit on which the platter resides, number of documents stored on the platter, number of pages stored on the platter, bytes used and maximum bytes available. For full platters, the platter information window 530 indicates the date the platter was filled. Finally, the platter information window 530 indicates when the displayed statistics were compiled.

The display 500 further includes an alert window 532, here shown displaying a color coded alert showing that the identified platter has a critically low capacity. The alert module 214 receives information from the storage status module 212 and the pending request module 210 and makes computations to determine if a platter has reached or will shortly reach a stage appropriate for an alert. The alerts are suitably color coded, with the color coding being based on the remaining free space on the relevant platter. In the present example, a yellow color code is used for an alert indicating that the platter has less than 5% of its capacity remaining, while a red color code is used for an alert indicating that the platter has less than 1% of its capacity remaining.

The display 500 also includes a control interface 534, allowing the user to enter commands directing intervals at which information is to be displayed, or choosing immediate display of a category of information. If a user fills the checkbox 536 and enters a desired value in the interval field 538, information will be updated at the interval entered in the interval field 538. The user may select immediate update of platter information or request information by pressing the "platter" pushbutton 540 or the "requests" pushbutton 542, respectively.

Finally, the display 500 includes clock windows 536A and 536B, displaying the time at locations of interest, for example the local time for the user and the time at a remote location with which the user frequently interacts.

Figure 6:
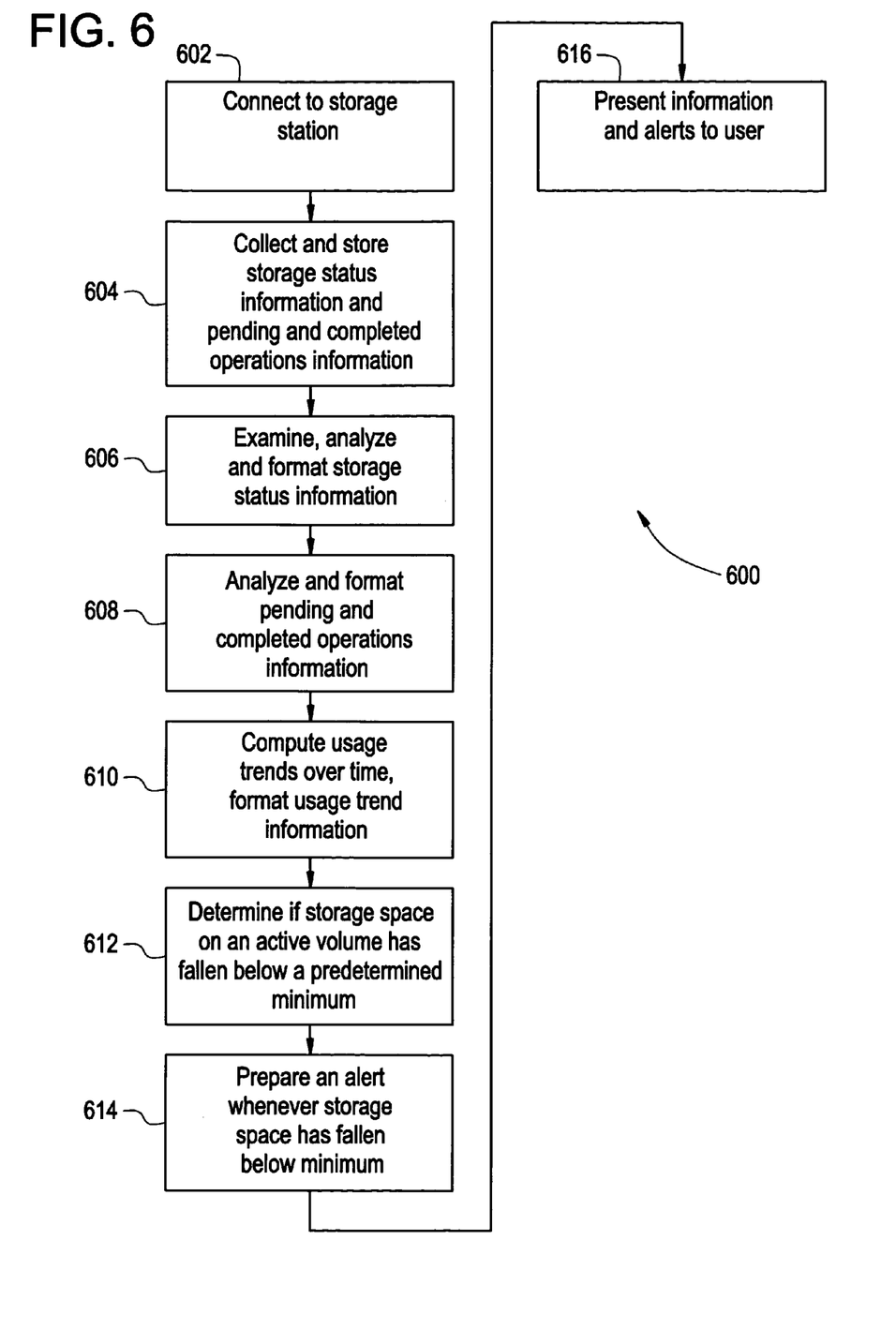
FIG. 6 illustrates a process of data storage and usage monitoring according to an aspect of the present invention.

FIG. 6 illustrates a process 600 of monitoring of data storage and retrieval according to an aspect of the present invention. At step 602, a connection is made to a storage station employed to store digitized documents. The storage station may suitably be similar to the storage station 102 of FIG. 1, and the connection may suitably be made using a system similar to the system 100 of FIG. 1. The documents stored on the storage station may suitably be relatively large and numerous and consumption of storage space by storage of documents may suitably be relatively rapid. Storage space on the storage station may comprise a plurality of removable and replaceable volumes.

At step 604, storage status information relating to the data stored using the storage station and the filled and available capacity of the storage station is stored in a storage status database, completed operations information describing storage operations performed using the storage station is stored in a completed operations database and pending request information relating to pending storage operations not yet executed are stored in an operations queue. At step 606, the storage status information is examined, analyzed and formatted. At step 608, the completed operations information and the pending request information are analyzed and formatted. At step 610, the completed operations information and the pending request information are analyzed in order to compute usage trends as a function of operations over time, and usage trend information is formatted. At step 612, the storage status information, the completed operations information and the pending request information are examined and analyzed to determine if available storage space on an active volume has fallen below a predetermined minimum capacity or will shortly fall below the predetermined minimum capacity.

At step 614, whenever it is determined that the available storage space on the active volume has fallen or is likely to fall below the predetermined minimum capacity, an alert is prepared identifying the volume and showing the remaining capacity. At step 616, the storage status information, the completed operations information, the pending request information, the usage trend information and any prepared alerts are presented to a user. Presentation of information to a user may be performed at predetermined intervals, in response to user requests or in response to the creation of an information category. For example, an alert may be presented to the user immediately upon preparation. Presentation to the user may suitably be accomplished employing a user interface similar to the interface 500 of FIG. 5.

While the present invention is disclosed in the context of aspects of a presently preferred embodiment, it will be recognized that a wide variety of implementations may be employed by persons of ordinary skill in the art consistent with the above discussion and the claims which follow below.

The invention claimed is:

1. A document storage and retrieval system for storage and retrieval of document images, comprising:
   a storage center including one or more data storage units, at least one data storage unit employing removable storage media;
   a storage server for controlling said removable storage media, the storage server being operative to receive data storage and retrieval commands and to write data to and read data from the one or more data storage units in accordance with the commands, the storage server being operative to maintain a storage transaction database for storing data relating to completed storage and retrieval transactions and a storage status database for storing data relating to contents and usage of each data storage unit, as well as a pending request queue for storing pending storage and retrieval commands and data related thereto; and
   a storage and retrieval monitor for examining the storage transaction database, the storage status database and the pending request queue in order to generate usage information for presentation to a user, the usage information including usage trend information indicating a rate at which storage capacity of said removable storage media is being filled and a projections indicating when said removable storage media will need to be removed and replaced.

2. The document storage and retrieval system of claim 1, wherein the storage and retrieval monitor is implemented as software executed by the storage server.

3. The document storage and retrieval system of claim 2, wherein the storage and retrieval monitor is accessible to each of a plurality of user terminals connected to the storage server and wherein the storage and retrieval monitor presents a user interface accessible by each user terminal, the storage and retrieval monitor being operative to accept user commands issued through each terminal in order to format and present usage information for display on a terminal in accordance with commands issued through that terminal.

4. The document storage and retrieval system of claim 3, wherein the storage and retrieval monitor is operative to issue an alert when available media capacity on a data unit falls below a predetermined minimum.

5. A storage and retrieval monitor for generating and presenting usage information relating to data storage in a document storage and retrieval system, comprising:
   a pending request module for examining queued storage and retrieval commands for storage and retrieval of data in the document storage and retrieval system and generating projected usage information indicating usage trends for storage capacity in the document retrieval system, the projected usage information including capacity usage rates for each of a plurality of storage units and storage media employed in the document storage and retrieval system;
   a storage status module for examining completed transaction information relating to storage units and storage media in the storage and retrieval system and generating storage status information indicating usage status for storage units and storage media in the storage and retrieval system;
   an alert module for examining the storage status information and the projected usage information and generating alert information when available storage capacity for one or more storage units or media volumes has fallen or is projected to fall below a predetermined capacity; and a user interface module for receiving the projected usage information, the storage status information and the alert information, formatting the projected usage, storage status and alert information for presentation to a user and presenting the projected usage, storage status and alert information for display to the user.

6. The storage and retrieval monitor of claim 5, wherein the user interface module is operative to receive user commands indicating which information is to be displayed and a desired format for the information, the user interface module being operative to select and format information to be displayed in response to the user commands.

7. The storage and retrieval monitor of claim 6, wherein the completed transaction information and the queued storage and retrieval commands include document information including identification of documents and document families and wherein the pending request module includes document information in the pending request information and the storage status module includes document information in the storage status information.

8. The storage and retrieval monitor of claim 7, wherein the projected usage information includes pending write requests over time and wherein the user interface module is operative to prepare and display graphs showing pending write requests over time in order to provide an overview of expected usage.

9. A method of monitoring of usage of data storage capacity in a document storage and retrieval system, comprising the steps of:
    collecting and storing completed transaction information relating to the results of data storage and retrieval commands for writing to and reading from a plurality of data storage units employing removable storage media;
    collecting and storing pending request information relating to data storage and retrieval commands that have been queued for execution for writing to and reading from the data storage units;
    examining and analyzing storage status information for the data storage units in order to determine the used and available capacity of the data storage units;
    examining and analyzing the completed transaction information and the pending request information together with the storage status information in order to generate usage trend information relating to projected usage and capacity of the data storage units; and
    formatting the storage status information and the usage trend information to provide an overview of present and projected usage of the data units and presenting the storage status information and the usage trend information for display.

10. The method of claim 9, further including a step of analyzing the storage status information and the projected usage information in order to determine when the available capacity of a storage unit falls below a predetermined value and preparing, presenting and formatting an alert whenever the available capacity of a storage unit falls below the predetermined value.

11. The method of claim 10, wherein the step of generating the usage trend information includes computing pending write requests over time and wherein the step of presenting the storage status information and the usage trend information includes presenting one or more graphs of pending write requests over time.

12. The method of claim 11, wherein the step of presenting the storage status information and the usage trend information for display includes receiving user commands for selection and formatting of desired information and presenting and formatting the information in accordance with the user commands.

* * * * *